United States Patent
Dodge et al.

(10) Patent No.: US 10,649,823 B2
(45) Date of Patent: May 12, 2020

(54) NOTIFICATIONS

(71) Applicant: Apple Inc., Cupertino, CA (US)

(72) Inventors: Dan T. Dodge, Ottawa (CA); Paul S. Streatch, Richmond (CA)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 16/116,458

(22) Filed: Aug. 29, 2018

(65) Prior Publication Data

US 2019/0102235 A1 Apr. 4, 2019

Related U.S. Application Data

(60) Provisional application No. 62/566,296, filed on Sep. 29, 2017.

(51) Int. Cl.
*G06F 9/54* (2006.01)
*H04L 29/08* (2006.01)

(52) U.S. Cl.
CPC .............. *G06F 9/542* (2013.01); *G06F 9/546* (2013.01); *H04L 67/26* (2013.01); *G06F 2209/544* (2013.01)

(58) Field of Classification Search
CPC .... G06F 9/542; G06F 9/546; G06F 2209/544; H04L 67/26
See application file for complete search history.

(56) References Cited

U.S. PATENT DOCUMENTS

| | | | |
|---|---|---|---|
| 6,754,219 B1 | 6/2004 | Cain et al. | |
| 7,404,203 B2 | 7/2008 | Ng | |
| 7,490,333 B2 | 2/2009 | Grimaud et al. | |
| 2004/0001498 A1 | 1/2004 | Chen et al. | |
| 2012/0185561 A1* | 7/2012 | Klein | H04L 67/2814 709/217 |
| 2014/0032707 A1 | 1/2014 | Doshi | |
| 2014/0181217 A1 | 6/2014 | Jolfaei et al. | |
| 2015/0074191 A1* | 3/2015 | Feng | H04L 63/102 709/204 |
| 2015/0188828 A1* | 7/2015 | Batz | H04L 43/026 370/235 |
| 2015/0215386 A1* | 7/2015 | Walsky | G06F 9/542 709/203 |
| 2016/0196531 A1* | 7/2016 | Shah | G06Q 10/10 705/345 |
| 2016/0217519 A1* | 7/2016 | Kozat | G06Q 30/0623 |

OTHER PUBLICATIONS

ISR/WO PCT/US2018/048176, dated Dec. 3, 2018, 14 pages.
(Continued)

*Primary Examiner* — Charles E Anya
(74) *Attorney, Agent, or Firm* — Kowert, Hood, Munyon, Rankin & Goetzel, P.C.; Lawrence J. Merkel

(57) ABSTRACT

In an embodiment, a server may support notifications using an underlying channel-based messaging scheme. A client may register for one or more notifications from a server, or may poll the server for notifications, using messages on the channel. The notification events may be transmitted on another to the client. The flexibility of the notification system may permit distributed systems to effectively manage their notification events, in some embodiments.

30 Claims, 8 Drawing Sheets

(56) References Cited

OTHER PUBLICATIONS

The Spring Nucleus: A Microkernel for Objects, Graham Hamilton and Panos Kougiouris, Sun Microsystems Laboratories, Inc. ,Mountain View, CA 94043 USASMLI TR-93-14, Apr. 1993,15 pages.
QNX Neutrino RTOS System Architecture, QNX Software Systems Limited, 162 pages, Feb. 20, 2014.
Mach: A New Kernel Foundation for UNIX Development Mike Accetta, Robert Baron, William Bolosky, David Golub, Richard Rashid, Avadis Tevanian and Michael Young Computer Science Department Carnegie Mellon University Pittsburgh, PA. 15213, Apr. 1986,15 pages.
ChorusOS 5.0 Features and Architecture Overview, Chapter 2 Architecture and Benefits of the Chorus OS Operating System Oracle Corporation, 2010,17 pages.
Linux/UNIX system programming training, EPOLL (7) 8 pages downloaded from Internet May 3, 2017.
Kevent(2) Mac OS X Developer Tools Manual Page, 6 pages, \downloaded from Internet Aug. 23, 2018.
Simple File Monitoring on Mac OS X,Thu, May 15, 2008 02:21:22 +0000, 3 pages.

* cited by examiner

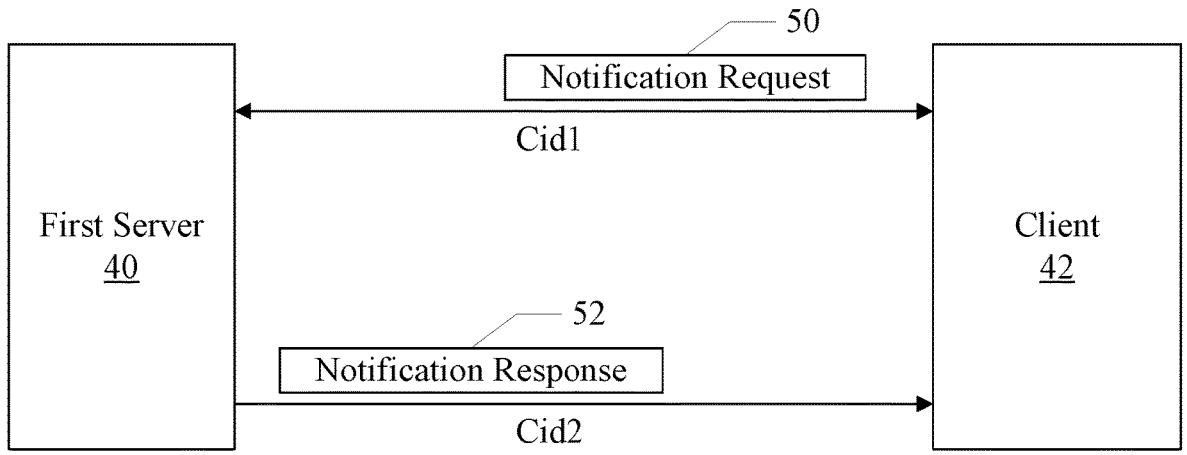

Fig. 5

Notify (Action, Update Operation, Events, Event Cid, Response Cid)

| Action | Definition |
|---|---|
| Poll | Return Active Events. Cancels Armed Events on Event Cid. Response Cid Ignored |
| Arm Level | Notification on Response Cid when an Armed Event is Active. Disarm Events for which Response has been Generated. Immediate Response if Matching Event is Active |
| Arm Edge | Notification on Response Cid on transition to Active for Armed Event. Events Remain Armed when Response Generated. Immediate Response if Matching Event is Armed, Subsequent Responses on Edges. |

| Operation | Definition |
|---|---|
| Set | Arm Events, Disarm Previously Armed Events if any |
| Add | Add Events to Armed Events (Union) |
| Remove | Remove Events from Armed Events |

60

Fig. 8

| Command | Definition |
|---|---|
| Read | Request a Read |
| Read Data | Read Data in Response to Notification |
| Write | Request a Write |
| Write Data | Transmit Write Data in Response to Notification |
| Notification | Arm Events for Notifications |

63

Fig. 9

| Events | Definition |
|---|---|
| Read | Cid Has Read Data Available |
| Write | Cid Has Write Data Space Available |
| File Size | File Size Changed |
| File Attribute | File Attributes Changed |
| File Link | File Links Changed |
| File Write | File Has Been Written to |
| Error | Error |

62

Fig. 10

NOTIFICATIONS

This application claims benefit of priority to U.S. Provisional Patent Application Ser. No. 62/566,296, filed on Sep. 29, 2017. The provisional patent application is incorporated herein by reference in its entirety. If any material in the provisional application conflicts with material expressly set forth herein, the material expressly set forth controls.

BACKGROUND

Technical Field

This disclosure relates generally to electronic systems and, more particularly, to notifications between programs executing on electronic systems.

Description of the Related Art

Most electronic systems (e.g. computing systems, whether stand alone or embedded in other devices) execute various programs to provide functionality for the user of the system. For example, client programs may execute on an electronic system, providing a user interface and/or other functionality on the electronic system. The client program may communicate with a server program executing on the electronic system or on a different electronic system to utilize one or more services provided by the server. For example, file servers may provide file storage, read and write of the files, etc. Application servers may provide application execution for the client, so that the client need not execute the application directly. A print server may manage one or more printers on a network and provide printing services. Communications servers may provide communication operations for a network such as email, firewall, remote access, etc. Database servers provide database management and access. There are many other types of servers.

In many cases, a client can be notified of certain events in the server. In a distributed environment, determining notifications and delivering them presents challenges.

SUMMARY

In an embodiment, a server may support notifications using an underlying channel-based messaging scheme. A client may register for one or more notifications from a server, or may poll the server for notifications, using messages on the channel. The notification events may be transmitted on another channel to the client. The flexibility of the notification system may permit distributed systems to effectively manage their notification events, in some embodiments. For example, in a client that is multi-threaded, each given thread may manage notifications that the given thread is to receive, using the different channels above. No one thread need manage all of the events. For example, a main processing loop thread need not be invoked for some notification events that may be managed locally by another thread. Furthermore, in an embodiment, the events maybe server-specific. Thus, a given server need not be aware of the events transmitted by other server types.

BRIEF DESCRIPTION OF THE DRAWINGS

The following detailed description makes reference to the accompanying drawings, which are now briefly described.

FIG. 5 is a block diagram of another embodiment of a client and server with channels therebetween.

FIG. 6 is a block diagram of one embodiment of a notify application programming interface (API).

FIG. 7 is a table illustrating exemplary actions for one embodiment.

FIG. 8 is a table illustrating exemplary operations for one embodiment.

FIG. 9 is a table illustrating exemplary commands for a file server embodiment.

FIG. 10 is a table illustrating exemplary conditions for one embodiment.

Figure 1:
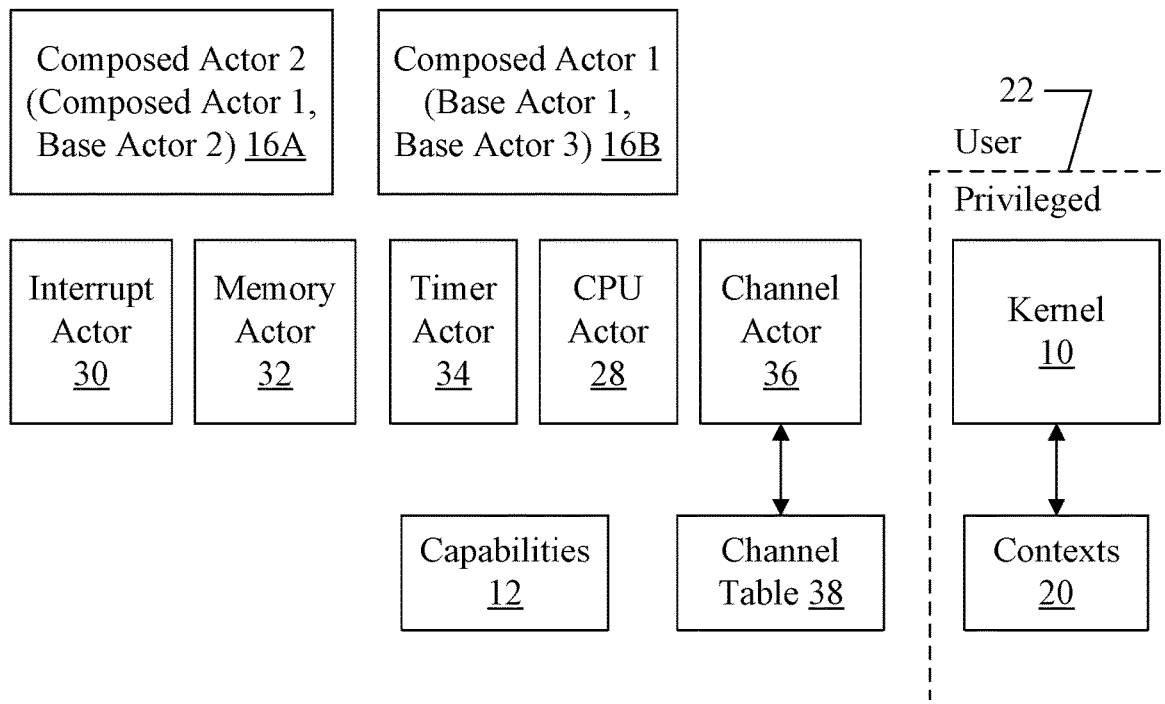
FIG. 1 is a block diagram of one embodiment of an operating system in accordance with this disclosure.

While this disclosure may be susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to. As used herein, the terms "first," "second," etc. are used as labels for nouns that they precede, and do not imply any type of ordering (e.g., spatial, temporal, logical, etc.) unless specifically stated.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "clock circuit configured to generate an output clock signal" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible. In general, the circuitry that forms the structure corresponding to "configured to" may include hardware circuits. The hardware circuits may include any combination of combinatorial logic circuitry, clocked storage devices such as flops, registers, latches, etc., finite state machines, memory such as static random access memory or embedded dynamic random access memory, custom designed circuitry, analog circuitry, programmable logic arrays, etc. Similarly, various units/circuits/components may be described as performing a task or tasks, for convenience in the description. Such descriptions should be interpreted as including the phrase "configured to."

The term "configured to" is not intended to mean "configurable to." An unprogrammed FPGA, for example, would not be considered to be "configured to" perform some specific function, although it may be "configurable to" perform that function. After appropriate programming, the FPGA may then be configured to perform that function.

Reciting in the appended claims a unit/circuit/component or other structure that is configured to perform one or more tasks is expressly intended not to invoke 35 U.S.C. § 112(f) interpretation for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

In an embodiment, hardware circuits in accordance with this disclosure may be implemented by coding the description of the circuit in a hardware description language (HDL) such as Verilog or VHDL. The HDL description may be synthesized against a library of cells designed for a given integrated circuit fabrication technology, and may be modified for timing, power, and other reasons to result in a final design database that may be transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and may further include other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA.

As used herein, the term "based on" or "dependent on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure. Generally, this disclosure is not intended to refer to one particular implementation, but rather a range of embodiments that fall within the spirit of the present disclosure, including the appended claims.

DETAILED DESCRIPTION OF EMBODIMENTS

Overview

Figure 2:
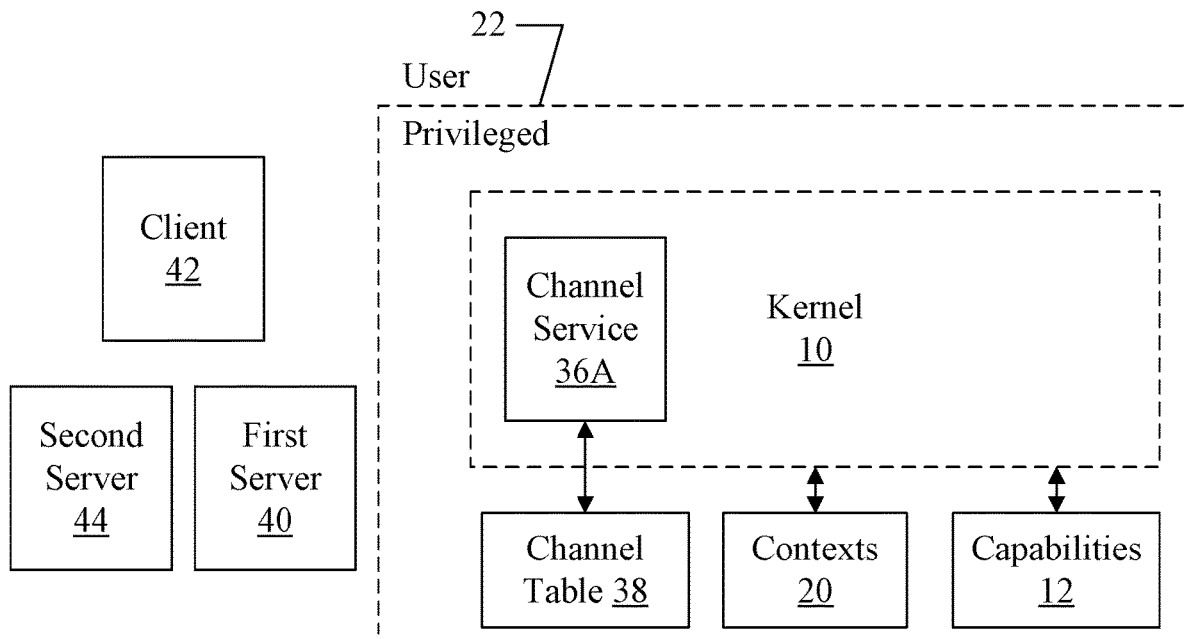
FIG. 2 is a block diagram of another embodiment of an operating system in accordance with this disclosure.

Various types of operating systems and system configurations may support the notifications described herein. FIGS. 1 and 2 are examples of such operating systems, and numerous other embodiments may implement other operating systems and/or configurations.

Turning now to FIG. 1, a block diagram of one embodiment of an operating system and related data structures is shown. In the illustrated embodiment, the operating system includes a kernel 10, a set of capabilities 12, a set of base actors, and a set of composed actors 16A-16B. The base actors, in this embodiment, may include a central processing unit (CPU) actor 28, an interrupt actor 30, a memory actor 32, a timer actor 34, and a channel actor 36. Other embodiments may include other base actors, including subsets or supersets of the illustrated base actors and/or other actors. The kernel 10 may maintain one or more contexts 20. The channel actor 36 may maintain a channel table 38. There may be any number of base actors and composed actors in a given embodiment.

Each capability 12 includes a function in an address space that is assigned to the capability 12. The data structure for the capability 12 may include, e.g., a pointer to the function in memory in a computer system. In an embodiment, a given capability 12 may include more than one function. In an embodiment, the capability 12 may also include a message mask defining which messages are permissible to send to the capability 12. Alternatively, other embodiments may use any other value(s) in place of the mask to identify valid messages. A given actor which employs the capability 12 may further restrict the permissible messages, but may not override the messages which are not permissible in the capability 12 definition. That is, the capability 12 definition may define the maximum set of permissible messages, from which a given actor may remove additional messages.

Each base actor 28, 30, 32, 34, and 36 may employ one or more capabilities 12. A given actor may employ any number of capabilities, and a given capability may be employed by any number of actors. Because actors 28, 30, 32, 34, and 36 directly employ capabilities 12 and do not include other actors, the actors 28, 30, 32, 34, and 36 may be referred to as base actors. The base actors may provide the low level functions of the operating system. Other actors may be composed actors, such as the actors 16A-16B. Composed actors 16A-16B may be assembled from other actors, either base actors or other composed actors. Any amount of assembly may be permitted in various embodiments (e.g. composed actors may include other actors that are themselves composed actors, which may further include actors that are themselves composed actors, etc.). In an embodiment, a composed actor 16A-16B may employ additional capabilities 12 as well.

Accordingly, an actor may generally be defined as a container for one or more capabilities, either directly employed or employed via the inclusion of another actor. A container may be any type of data structure, class, data type, etc. that can store data allowing the capabilities to be accessed/executed. For example, a data structure with pointers to capabilities (or to other actors which point to the capabilities in a pointer chain) may be one form of container. More generally, a container may be any structure that organizes a group of objects in a defined way that follows specific access rules. In an embodiment, actors may be compiled into the operating system and may be optimized to limit the number of exceptions that may occur (e.g. by merging code into the actor, allowing some or all of the actor to execute in privileged space, etc.). When the code is merged together, the exception in the code one actor that would have lead to execution of code in another actor may be eliminated since the code has been merged. However, the model that the operating system is designed to may be that the actor is a container and may be proven to be safe and stable. Then, the compiled version may be shown to be equivalent to the model and thus also safe and stable.

Safety and stability may be critical in certain products in which the operating system may be employed. For example, the operating system may be in a computing system that is embedded in the product. In one particular case, the product may be a vehicle and the embedded computing system may provide one or more automated navigation features. In an embodiment, any type of vehicle may be used, such as an aircraft, boat, automobile, recreational vehicle, etc. In some embodiments, the automated navigation features may automate any portion of navigation, up to and including fully automated navigation in at least one embodiment, in which the human operator is eliminated. Safety and stability may be key features of such an operating system. Additionally, security of the operating system may be key in such cases, as an attack which disables or destabilizes the system may disable the vehicle or possibly even cause a crash. In a traditional monolithic kernel operating system, the one operating system entity (the kernel) is responsible for all functions (memory, scheduling, I/O, time, thread management, interrupts, etc.). Any compromise in any of the functions could compromise the whole system. In the present operating system, however, the entities are separated and communicate via channels that do not permit compromise. Each entity may be provided with as much privileged and as needed to complete its operation. Thus, a compromise of one entity may not compromise the system and the leakage of privileged that often occurs in the monolithic kernel is not possible.

The dotted line 22 divides the portion of the operating system that operates in user mode (or space) and the portion that operates in privileged mode/space. As can be seen in FIG. 1, the kernel 10 is the only portion of the operating system that executes in the privileged mode in this embodiment. The remainder of the operating system executes in the user mode. Privileged mode may refer to a processor mode (in the processor executing the corresponding code) in which access to protected resources is permissible (e.g. control registers of the processor that control various processor features, certain instructions which access the protected resources may be executed without causing an exception, etc.). In the user mode, the processor restricts access to the protected resources and attempts by the code being executed to change the protected resources may result in an exception. Read access to the protected resources may not be permitted as well, in some cases, and attempts by the code to read such resources may similarly result in an exception. Because most of the operating system executes in the user space, the user mode protections may apply. Thus, "privilege leak," where privileged code that is expected to access only certain protected resources but actually accesses others through error or nefarious intent, may be much less likely in the disclosed embodiments.

Moreover, the kernel 10 may be responsible for creating/maintaining contexts 20 for actors, but may include no other functionality in this embodiment. The contexts 20 may be the data which the processor uses to resume executing a given code sequence. It may include settings for certain privileged registers, a copy of the user registers, etc., depending on the instruction set architecture implemented by the processor. Thus, each actor may have a context (or may have one created for it by the kernel 10, if it is not active at the time that another actor attempts to communicate with it).

The CPU actor 28 may be an actor by which other actors may interact with one or more CPUs in the computer system on which the operating system executes. For example, access to various processor state may be provided through the CPU actor 28. Interrupt delivery to a CPU may be through the CPU actor 28.

The interrupt actor 30 may be responsible for handling interrupts in the system (e.g. interrupts asserted by devices in the system to the processor, or processor's assertions to other processors). In an embodiment, the interrupt actor 30 may be activated by the kernel 10 in response to interrupts (as opposed to exceptions that occur within a processor in response to internal processor operation/instruction execution). The interrupt actor 30 may gather information about the interrupt (e.g. from an interrupt controller) and determine which actor in the system should be activated to respond to the interrupt. The interrupt actor 30 may generate a message to the targeted actor to deliver the interrupt.

The memory actor 32 may be responsible for managing memory, providing access to memory when requested by other actors and ensuring that a given memory location is only assigned to one actor at a time. The memory actor 32 may operate on physical memory. Other actors may be implemented to, e.g., provide a virtual memory system. Such actors may use the memory actor 32 to acquire memory as needed by the virtual memory system. That is, such actors may be composed actors that incorporate the memory actor 32 and other functions.

The timer actor 34 may be responsible for implementing a timer in the system. The timer actor 34 may support messages to read the timer, set an alarm, etc.

The channel actor 36 may be responsible for creating and maintaining channels between actors. Channels may be the communication mechanism between actors for control messages. Data related to the control may be passed between actors in to any desired fashion. For example, shared memory areas, ring buffers, etc. may be used.

In an embodiment, an actor may create a channel on which other actors may send the actor messages. The channel actor 36 may create the channel, and may provide an identifier (a channel identifier, or Cid) to the requesting actor. The Cid may be unique among the Cids assigned by the channel actor 36, and thus may identify the corresponding channel unambiguously. The actor may provide the Cid (or "vend" the Cid) to another actor or actors, permitting those actors to communicate with the actor. In an embodiment, the actor may also assign a token (or "cookie") to the channel, which may be used by the actor to verify that the message comes from a permitted actor. That is, the token may verify that the message is being received from an actor to which the channel-owning actor gave the Cid (or another actor to which the actor passed the Cid). In an embodiment, the token may be inaccessible to the actors to which the Cid is passed, and thus may be unforgeable. For example, the token may be maintained by the channel actor 36 and may be inserted into the message when an actor transmits the message on a channel. Alternatively, the token may be encrypted or otherwise hidden from the actor that uses the channel. In an embodiment, the token may be a pointer to a function in the channel-owning actor (e.g. a capability function or a function implemented by the channel-owning actor).

The channel actor 36 may track various channels that have been created in a channel table 38. The channel table 38 may have any format that permits the channel actor to identify Cids and the actors to which they belong. When a message having a given Cid is received from an actor, the channel actor 36 may identify the targeted actor via the Cid and may request activation of the targeted actor and relay the message to the targeted actor.

In an embodiment, an actor may not be active (e.g., in execution) unless a message has been sent to the actor. An activation of an actor may be an instantiation of an actor to process the message. Each activation may have an associated context 20, that is created when the activation begins execution. Once the activation completes execution on the message, the activation terminates (or is "destroyed"). The context 20 may be deleted when the activation is destroyed. A new execution of the actor may then cause a new activation.

FIG. 2 is another embodiment of an operating system (and clients and servers that may execute with the operating system). In the illustrated embodiment, the kernel 10 is shown in the privileged space and the clients 42 and servers 40 and 44 are in user space, separated by the dotted line 22 similar to FIG. 1.

The kernel 10 may manage contexts 20, as previously described. Additionally, the kernel 10 may further include code to provide certain services that were provided by actors in user space in the embodiment of FIG. 1. For example, the channel service 36A may manage channels by which various clients and servers may communicate with each other and with operating system services. Accordingly, the client 42 and the servers 40 and 44 may have channels to the channel service 36A in order to request additional channels, delete existing channels, etc. The channel service 36A may store channel data in the channel table 38, which may lie in privileged space as well in this embodiment.

The capabilities 12 may also reside in the privileged space 22. The capabilities 12 may serve as the foundation for the various operating system services employed by the kernel 10. The capabilities 12 may further serve as the foundation for the clients and servers in the system, in some embodiments. In other embodiments, the kernel 10 may not be capabilities-based.

Other services of the kernel 10 may include an interrupt service, a memory service, a timer service, and a CPU service. These services may provide the operation previously discussed for the actors 30, 32, 34, and 28, respectively. There may be still further services, and the above mentioned services may be expanded beyond the base services described previously.

Accordingly, the client 42 and the servers 40 and 44 described below may be actors, as illustrated in FIG. 1, or may be single threaded or multi-threaded programs, e.g. in the system of FIG. 2.

Notification System

Figure 3:
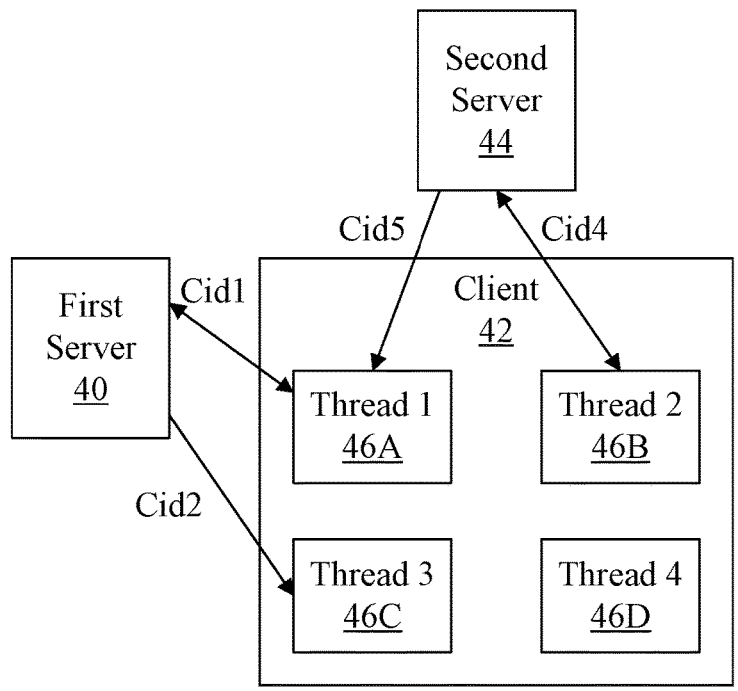
FIG. 3 is a block diagram of one embodiment of a client and servers.

FIG. 3 is a block diagram of one embodiment of a first server 40, a client 42, and a second server 44. The client 42 includes various threads including threads 46A-46D as shown in FIG. 3. The client 42 has channels to the server 40, each of which may be identified by a corresponding Cid (e.g. Cids 1 and 2 in FIG. 3). Similarly, the client 42 has channels to the server 44, each of which may be identified by a corresponding Cid (e.g. Cids 4 and 5 in FIG. 3). Additional channels between the client 42 and the servers 40 and 44 may be provided, in other embodiments (not shown in FIG. 3). In particular, the thread 46A may have access to the channels with Cid 1 and 5 and the thread 46C may have access to the channel with Cid2. The thread 46B may have access to the channel with Cid4.

As mentioned previously, each server 40 and 44 may offer one or more services, which may be employed by the client 42 to accomplish a task that the client 42 needs to complete. A client 42 may employ a service by transmitting one or more commands to the server 40 or 44 that offers the desired service. A service may be employed by transmitting multiple commands; a single command may invoke the service and provide the information used by the server 40 or 44 to perform the service; or any combination of the former may be used. The commands may be transmitted over a channel (e.g. the channel with Cid1 for the first server 40 or the channel with Cid4 for the second server 44). The server 40 or 44 may return a response to each command, e.g. over the same channel that the client 42 used to send the command. In the absence of notifications, the client 42 may block waiting on the response. Alternatively, in some cases, the server 40 or 44 may respond to a command that results in high latency with a response that indicates that the client 42 may attempt the command again at a later time to see if the command may be completed, so that the client 42 does not block for a long period of time. Either course of action may add complication and/or inefficiency to the client 42 and/or the server 40 or 44.

Figure 4:
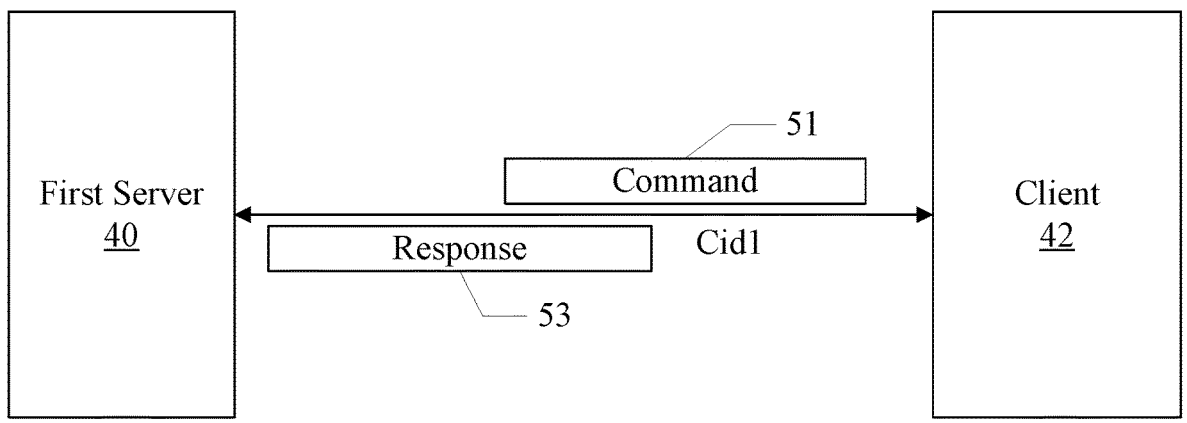
FIG. 4 is a block diagram of one embodiment of a client and server with a channel therebetween.

For example, FIG. 4 is a block diagram of an example in which the first server 40 receives a command 51 from the client 42 and transmits a synchronous response 53 on the same channel to the client 42 (the channel having Cid1 in FIG. 4). Until the response 53 is received, the client 42 may be waiting for the response. The client 42 may be blocked entirely (e.g. if the client 42 is single-threaded, or the current thread cause the command 51 to be transmitted and there are no other threads that are currently executable in the client 42). Alternatively, the client 42 may include the command in a first thread, and other threads may be designed to call the first thread to transmit a command and to continue processing while awaiting the response from the first thread. The first thread may block until the response is received, but the other threads may continue processing without the response to the command. Such threads may employ some other mechanism to determine when the response is received (e.g. a callback, periodic polling, etc.).

As a specific example, a file server may support a read command that may specify a number of bytes to be read from a location in the file server. The response may include the number of bytes actually provided, as well as the bytes themselves. A response with zero bytes may indicate a delay in the read operation, and the client 42 may transmit the read command again later to read the bytes. Alternatively, the file server may delay the response until the requested bytes are available to transmit to the client 42.

When notifications are available, the client 42 may register for events related to a command, and may receive asynchronous notification responses when a registered event occurs. The notification request and asynchronous response are shown in FIG. 5 and described in more detail below. Applying notifications to the read command above, for example, may include the client 42 registering for a read event indicating that read data is available. The command 51 may be transmitted, and the file server may response with a response 53 including the read data if the read data is available within a relatively short period of time. If the read data will not be available within the short period of time, the file server may respond with zero bytes. The client 42 may then wait for the notification response before attempting to read the data again. Alternatively, the client 42 may register for the read event and transmit a read command that is defined to cause a response from the file server indicating that the command has been received. Subsequently, the read event may be signaled with the read data is available, and a read data command may be used by the client 42 to read the data (in response to the read event). The client 42 and/or the servers 40 and 44 may be simpler and/or more efficient using the notification mechanism for potentially long-latency commands. Other commands may support the notification mechanism with events. Any combination of commands which may correspond to notification events and synchronous commands may be used in various embodiments.

The client 42 may register or poll for notifications from the server 40 using the channel Cid1 (as shown in FIG. 3), and similarly may register or poll for notifications from the server 44 using the channel Cid4 (as shown in FIG. 3). For example, the Cids 1 and 4 may be channels to files in a file server, applications in an application server, etc. Generally, the Cids on which notifications are requested may be the channel to the resource from which the notifications occur (e.g. a channel on which the client 42 may transmit other commands to the resource). Notification responses may be transmitted via the channels Cid2 and Cid5 for the servers 40 and 44, respectively, as illustrated in FIG. 3. Generally, a notification response may be an indication that one or more events have been detected by a server. The events may be related to the client's interaction with the server, or may be otherwise informative to the client of operation of the server. The events may be server-specific. That is, different servers (providing different services) may define different events than other servers. In an embodiment, poll responses may be sent on the channel Cid1 or Cid4 for the servers 40 and 44, respectively.

If the client 42 polls for events, the response from the polled server 40 or 44 may indicate if any of the polled events are active at the time the poll occurs. However, if an event occurs subsequently to the poll response, the client 42 may not be informed of the event. On the other hand, if the client 42 registers for one or more events, and at least one of the events is not active at the time of registration, the client 42 may be informed via a notification response at a subsequent time when the event occurs.

By providing for the possibility of informing more than one thread of the occurrence of events, the notification system may be more flexible than a wholly synchronous and centralized notification mechanism. For example, the thread 46A may register for certain events, and another thread (e.g. thread 46C) may register for additional events and may receive notifications on its own channel from the server 40 or 42. The thread 46A may respond to events in its registration, and the additional events may be in the purview of thread 46C. Accordingly, the client 42 may have a distributed processing of events, as desired, in its set of threads. A main processing loop may be one of the threads, for example, and may process a subset of events. Other threads may have additional events that affect that thread, but may be local to that thread and thus need not be processed by the main loop or other threads.

It is noted that, while the response channels (Cid2 and Cid5 in the illustrated embodiment) are shown as going to different threads than the thread that generates the notification requests, the response channels may be provided to the same thread that generates the notification request, if desired.

FIG. 5 is a block diagram illustrating the channels Cid1 and Cid2 between the client 42 and the server 40, for the embodiment shown in FIG. 3. The channel Cid1 may be used by the client 42 to transmit notification requests to the server 40 (e.g. the notification request 50 in FIG. 5). More generally, the client 42 may use the channel Cid1 to communicate with a resource on the server 40, including transmitting notification requests and other commands supported by the resource (e.g. read and write commands to a file, for an embodiment of the server 40 that is a file server). The client 42 may further receive various command responses on the channel Cid1. In one embodiment, the responses may include a response to a notification request. The response may include an acknowledgement of the notification request, indicating that the request was received and is a valid request. Additionally, if the notification request is a poll request, the response on the Cid1 may include any active events that are detected among the events specified by the notification request, and thus the poll notification may be completed.

The notification requests may specify events that the client 42 is querying, the type of query (e.g. poll or register), the channel on which the notifications are being requested, and the channel or channels on which the notification responses should be send. For example, in FIG. 5, the channel Cid1 may be the channel on which the notifications are being requested and Cid2 may be specified for notification responses (e.g. notification response 52). In some embodiments, more than one channel may be specified for responses. If more than one response channel is specified, the notification response may be transmitted on each response channel. In some embodiments, synchronous notification responses (e.g. poll responses) may be transmitted on Cid1 (as discussed above) and asynchronous notification responses may be transmitted on Cid3. The asynchronous responses may be responses to armed events, since the events may occur at any time after the notification request has been transmitted. As mentioned previously, Cid1 may point to a resource on the server 40 for which notifications are being requested. For example, if the server 40 is a file server, the Cid1 may be a Cid to a file or group of files.

FIG. 6 is a block diagram illustrating one embodiment of an application programming interface (API) 56 to generate a notification request in the client 42. A thread 46A-46D in the client 42 may use the API to establish desired notifications. In the illustrated embodiment, the API 56 may specify an action, an update operation, a set of one or more events, an event Cid, and a response Cid. The action may indicate the type of notification being requested. FIG. 7 illustrates one embodiment of actions that may be supported, and will be described in more detail below. The update operation may specify how the events specified in the notification response are to affect earlier-specified events. That is, because threads may generate multiple notification requests for different sets of events, the effect of one notification request on another for the same Cid may be specified. The events are the set of events for which the thread is waiting. The events Cid is the Cid for the channel to the resource(s) on the server for which notifications are being requested (e.g. Cid1 in FIG. 5). The response Cid is the Cid for the channel used for asynchronous responses (if any) (e.g. Cid2 in FIG. 5).

It is noted that, in an embodiment, a notification request may be supported that is sent on a separate channel for multiple resource channels (e.g. Cids 1 and 4 in FIG. 5) to which a given event or events are to apply. Such embodiments may be a convenient and/or performance-enhancing way to apply notifications for the same set of events to multiple resources.

FIG. 7 is a table 58 illustrating one embodiment of the actions that may be specified in notification requests. Other embodiments may employ additional actions, or subsets of the actions shown and additional actions, etc.

The poll action may be used when a thread is to poll for the events. The notification response may be generated by the server in response to receiving the notification request with the poll action. The notification response may indicate any of the events specified by the notification request that are active when the poll notification request is received, or may indicate no active events if none of the specified events are active. An active event may be an event that has been detected since a most recent clearing of the event. Conversely, an inactive event may be an event that has not been detected since the most recent clearing of the event. The matter in which events are cleared may vary based on the type of server and even based on various server implementations of the same type, and may be separate from the reporting of events. In an embodiment, the poll action may cause previous armed events for the same Cid to be cancelled, although other embodiments may not update the armed events. Thus, the update operation may be ignored for poll actions. Additionally, the response Cid may be ignored and the notification response may be provided on the event Cid, since the response is provided immediately.

If the notification request is registering to be informed of one or more events, the illustrated embodiment may support two types of notifications: level and edge. The operation of the two types may be based on level sensitive versus edged triggered interrupts in hardware. A level sensitive interrupt may signal an interrupt via its logical level (e.g. the interrupt may be asserted (active) low and deasserted (inactive) high, or vice-versa). An edge-triggered interrupt may cause an interrupt responsive to the edge (transition) from deasserted (inactive) to asserted (active). The state of active or inactive is not necessarily accorded a meaning in edge-triggered interrupts. In either case, the events specified by the notification request may be referred to as "armed," because an occurrence of the event generates a notification response. That is, if the event becomes active and the event is armed, a notification response may be generated on the response Cid(s). Disarmed events may not cause a notification response, even if they become active.

The arm level action may be level sensitive. If one or more of the events specified in the notification request are active, the server may transmit a notification response on the response Cid. The server may also disable the events for which responses have been generated. When the notification request with the arm level action is received, the server may generate a notification response immediately if any matching events are active.

The arm edge action may be edge triggered. The server may generate a notification response on the response Cid on a transition of a specified event from inactive to active. The event may remain armed (and thus may generate additional notification responses if the event transitions from inactive to active again at a later point in time). Alternatively, in an embodiment, the event may remain armed or may be disarmed responsive to an indication transmitted in the notification request. For example, the notification request may include an "arm" flag which controls whether or not the events remain armed after causing a notification response. Similar to the arm level action above, the server may generate a notification response immediately if one or more events specified in the notification request are active when the notification response is received. Subsequent notification responses may be generated based on edges from inactive to active.

In an embodiment, the notification request may also include an indication of whether or not commands that would be transmitted in response to an event will also automatically re-arm the event. For example, the notification request may include a re-arm flag that may control whether such commands cause an automatic re-arm of the event. The commands may be commands that would consume the event, and thus if the event is still active after performance of the command and the command re-arms the event, the notification response may be transmitted again because there is another instance of the event to be consumed. For example, when read event is detected (see FIG. 8 below), a read command may be transmitted to read the data (thus consuming the data indicated by the read event). If there is still more data remaining after the read command is performed, the re-arming of the event may result in another notification response and thus another read command may be transmitted to read the data.

FIG. 8 is a table 60 illustrating one embodiment of update operations that may be supported by the notification request. Other embodiments may employ additional operations, or subsets of the operations shown and additional operations, etc.

In the illustrated embodiment, the supported operations may include a set operation, an add operation, and a remove operation. The update operations may specify how the armed events for a given event Cid (or a given response Cid) may be updated if more than one notification request is sent for the Cid. Thus, if only one client 42 uses the event Cid or response Cid, then the update operations specify how updates from different threads (or multiple updates from the same thread) are to be combined. If more than one to client 42 uses the event Cid or response Cid, the update operations specify how the events are shared by the clients.

The set operation may arm the events specified in the notification request, overriding any previously armed events. That is, events that were previously armed are disarmed, so that the armed events after the update operation are only the events specified in the notification response. The add operation may add the events that are specified in the notification request to the currently armed events. That is, the resulting armed events after the update operation may be the union of the previously armed events and the events specified in the notification request. Viewed in another way, if armed events are represented by a bit vector, where a set bit indicates an armed event, the resulting armed events may be the logical OR of the previous bit vector and a bit vector representing the events from the notification request. The remove operation may remove the events specified by the notification request (e.g. disarm the specified events).

FIG. 9 is a table 63 illustrating exemplary commands that may be supported by one embodiment of the server 40 that is operating as a file server. Other embodiments may employ additional commands, or subsets of the operations shown and additional commands, etc.

A read command may be supported which requests a read of a location in the file server, and may specify a number of bytes to be read. Subsequently, a read event may be recorded by the file server when the read data becomes available. In response to the read event, the client 42 may transmit a read data command to read the data (which is now available as indicated by the read event). In some embodiments, the read event may indicate that data is available, but may not be specific to a particular read command. Thus, the client 42 may transmit a read data command and receive a response indicating zero bytes of data. In such a case, the client 42 may rearm the read event (if needed) and wait for another read event.

A write command may be supported which requests a write to a location in the file server, and may specify a number of bytes to be written. Subsequently, a write event may be recorded by the file server when space for the write data becomes available. In response to the write event, the client 42 may transmit a write data command to transfer the write data to the file server. A subsequent file write event may indicate that the file has been written, if notification of the completion is desired.

The notification command may also be provided, as described herein, to arm various events.

In an embodiment, each of the above commands may receive a synchronous response from the file server indicating that the command has been received (e.g. an "acknowledgement" response). The file server may transmit the acknowledgement response with relatively little delay after the corresponding command is received.

FIG. 10 is a table 62 illustrating exemplary events that may be supported by one embodiment of the server 40 that is operating as a file server. Other embodiments may employ additional events, or subsets of the operations shown and additional events, etc.

In the illustrated embodiment, the events include a read event, a write event, a file size event, a file attribute event, a file link event, a file write event, and an error event. The read event may indicate that read data is available on the Cid. Thus, the read event may occur after the client 42 has transmitted a read command on the Cid, and may be used by the client 42 to determine when to read the data from the server 40. The write event may indicate that the Cid is able to accept write data for a write command previously transmitted on a channel. For example, the server may have a write data buffer for each channel, or each file, to store data to be written to the file. If the data buffer has space for the write data corresponding to the write command, the write event may become active to indicate that the write data may be transmitted.

Other events may be used to monitor the file. For example, if the file size has changed, another client may have updated the file. The file size event may be used to detect the change in size. The file attributes may be changed if another client has sufficient access to the file to change the attributes, and may change the client 42's access to the file. The file attributes event may indicate such change. There may be a variety of file attributes, such as access rights (e.g. read/write/execute rights for different groups of users, as in various UNIX®-like operating systems such as Linux®) and other metadata supported by the file system. For example, other metadata may include the date of file creation, last update, and/or last access; the user who created the file, last updated the file, and/or last accessed the file; etc. The file links may also change, which may be detected by the file link event. A link to a file is a directory entry that may be used to locate a file. Hard links locate a file in a particular directory structure. The is, a file is logically stored in the directory indicated by the hard link. Symbolic links provide a link to a file in a directory location that a given user desires, but the symbolic link points to the hard link directory (directly or indirectly through other soft links). The file link event may indicate hard link changes, symbolic link changes, or both.

The file write event may indicate that the file associated with the Cid has been written. The file write event may serve as a completion notice indicating completion of a write operation after a client has made a write request, received the write event indicating that the write data may be transmitted, and transmitted the write data. Alternatively, or in addition, the file write event may indicate that another client or Cid has written the file.

The error event may indicate that an error was detected with respect to the file. Various error codes may be supported and may include such errors as file not found, file not accessible, read data failure, write failure, etc.

As mentioned above, the events in table 62 may be exemplary events supported by a file server. Other types of servers may support other sorts of events. For example, an application server may support events such as application complete, application update (if the application is interactive with the user, for example, or updates a file on the client), application data read (if the application uses data from the client), error, etc. A print server may support various events such as print complete, printer busy, printer queue full, printer queue empty, printer online/offline, error, etc. A communication server may support events such as network message blocked, network message available, message transmit failure, error, etc. A database server may include events such as query complete, query update, database update complete, rewind, etc.

Figure 11:
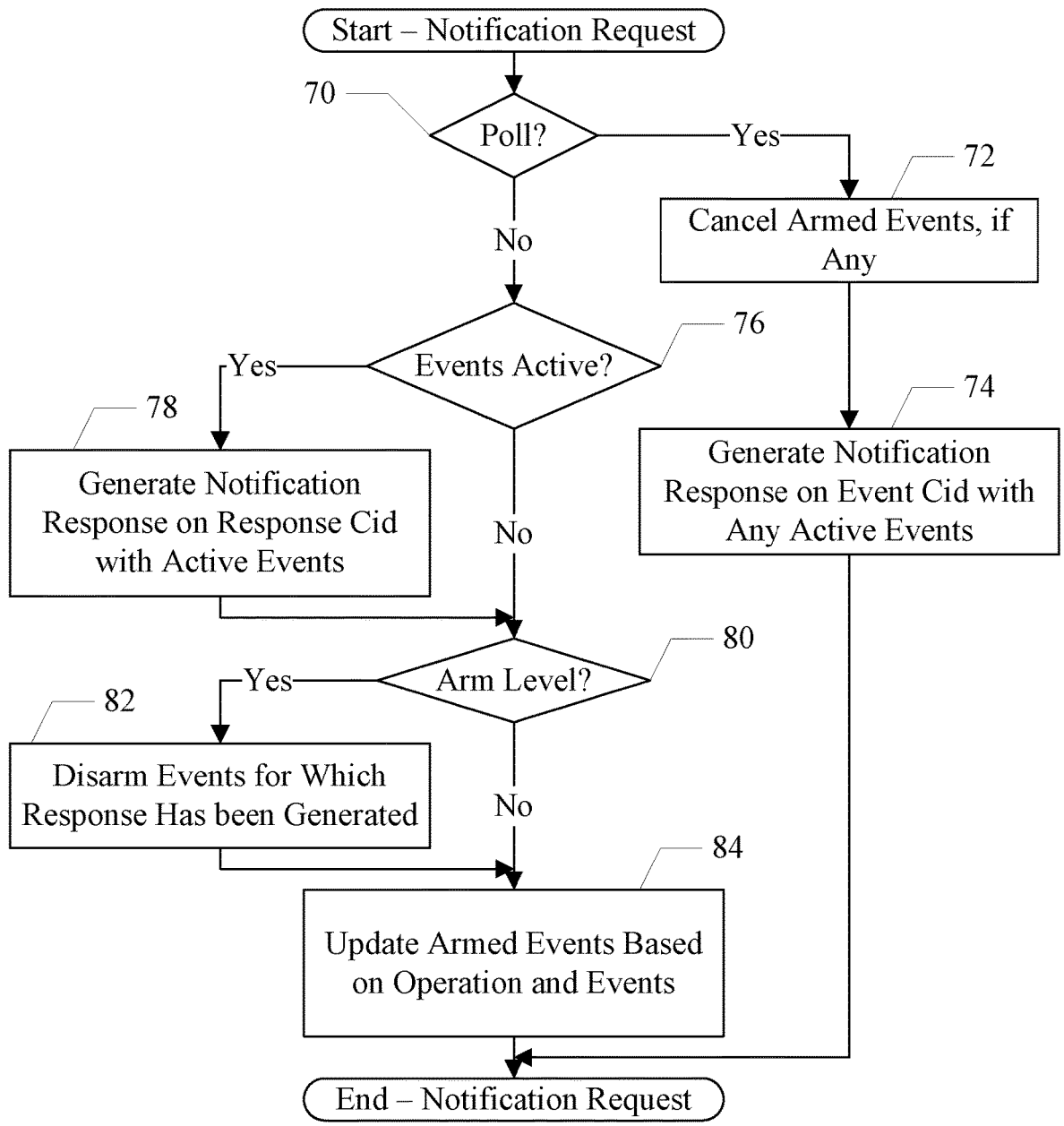
FIG. 11 is a flowchart illustrating operation of one embodiment of a server in response to a notification request from a client.

FIG. 11 is a flowchart illustrating operation of one embodiment of a server (e.g. the server 40 or 44) in response to a notification request from a client. While the blocks are shown in a particular order for ease of understanding, other orders may be used. The server may include instructions which, when executed in a computer system, may implement the operation shown in FIG. 11. That is, the server may be configured to implement the operation shown in FIG. 11.

If the notification request is a poll request (decision block 70, "yes" leg), the server may cancel armed events for the event Cid specified in the notification request (if any) (block 72). The server may also generate a notification response on the event Cid, indicating one or more active events from among the events specified by the notification response. If none of the specified events are active, the notification response may indicate no events. That is, a notification response may be generated in response to a poll request independent of whether or not there are any active events (block 74).

If the notification request is not a poll request (decision block 70, "no" leg), the server may determine if any of the events specified in the notification response are active (decision block 76). If so (decision block 76, "yes" leg), the server may generate a notification response on the response Cid indicating the active events (block 78). If the notification request is an arm level notification (decision block 80, "yes" leg), the server may disarm events specified in the notification request (block 82). The server may update the armed events for the event Cid/Response Cid based on the operation specified in the notification request (e.g. add, delete, or remove) and the specified events (less events for which the response is generated for arm level notification requests) (block 84). In an embodiment, as previously mentioned, an arm flag or other indication in the notification request may control whether arm edge events remain armed or not after generating a notification response. If the arm flag indicates that such events are not to remain armed, these events may also be disarmed when they have generated a notification response.

Figure 12:
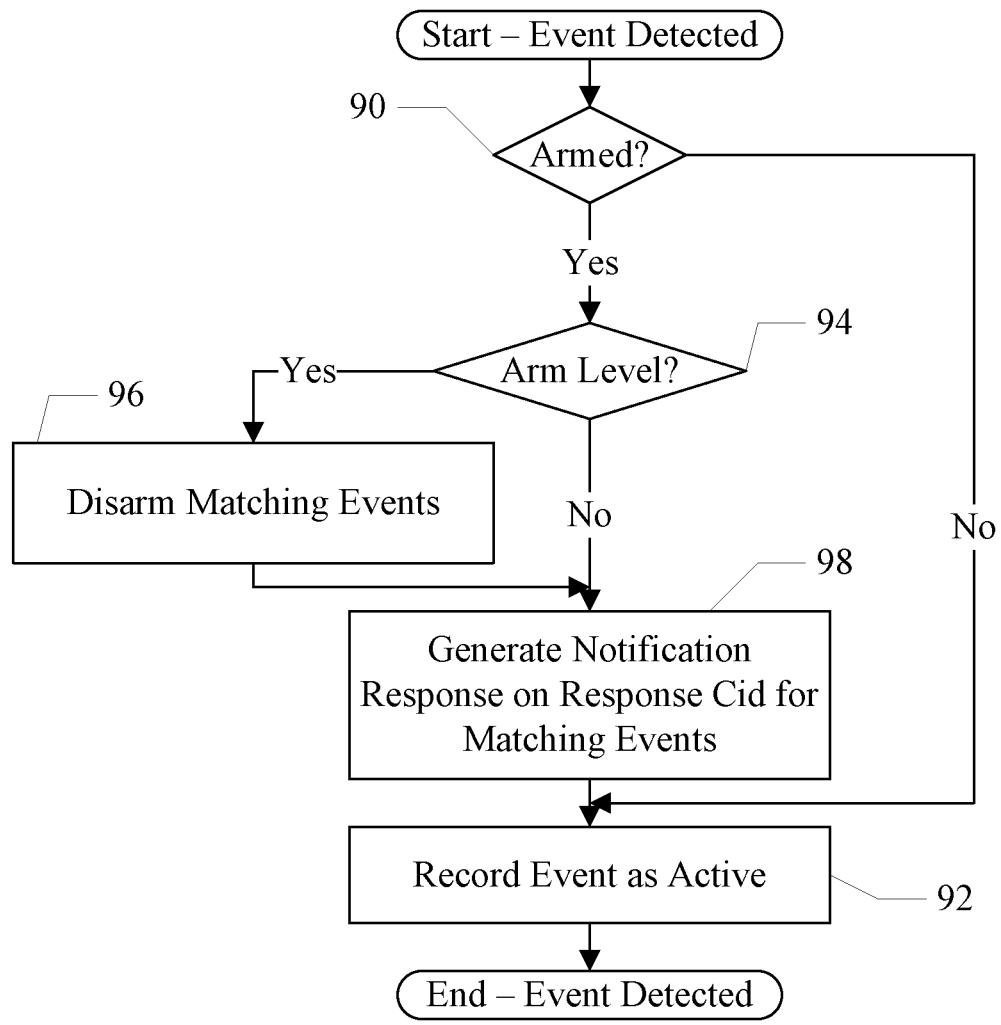
FIG. 12 is a flowchart illustrating operation of one embodiment of a server in response to detection of a notify event.

FIG. 12 is a flowchart illustrating operation of one embodiment of a server (e.g. the server 40 or 44) in response to detecting an event. While the blocks are shown in a particular order for ease of understanding, other orders may be used. The server may include instructions which, when executed in a computer system, may implement the operation shown in FIG. 12. That is, the server may be configured to implement the operation shown in FIG. 12.

If the event is not armed on any Cid (decision block 90, "no" leg), no notification responses are generated. The server may record the event as active so that a subsequent poll or arming of the event may detect the active event (block 92). Similarly (not shown in FIG. 12), if an event deactivates, the server may record the event as inactive.

If the event is armed on at least one Cid (decision block 90, "yes" leg) and the event is armed level (i.e. not armed edge—decision block 94, "yes" leg), the server may disarm the matching event for each Cid that is armed level (block 96). As mentioned above, in embodiments that support an arm flag or other indication to control the arm edge events, the matching events may be disarmed or remain armed in response to the arm flag/indication. In either case (armed level or armed edge), the server may generate a notification response on each Cid for which the event is armed (block 98). It is noted that multiple events may occur in close proximity to each other in time, and in such cases the notification response may identify multiple events. The server may also record the event as active (block 92).

In an embodiment, traditional operating system application programming interfaces (APIs) such as poll( ) and select( ) in the Linux® operating system may use the notifications described herein to implement the APIs.

Figure 13:
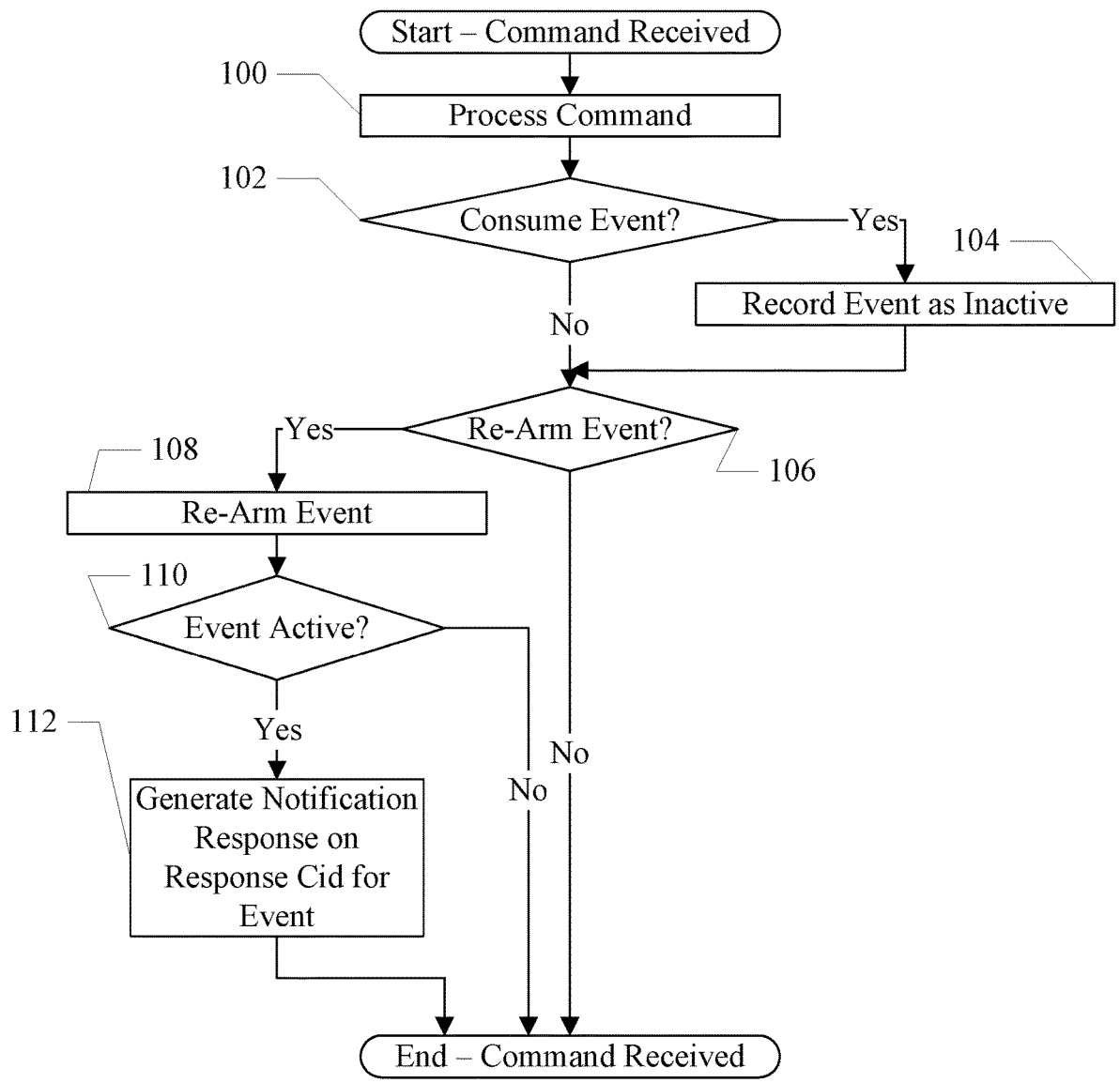
FIG. 13 is a flowchart illustrating operation of one embodiment of a server in response to a command from a client.

FIG. 13 is a flowchart illustrating operation of one embodiment of a server (e.g. the server 40 or 44) in response to receiving a command other than a notification request from a client. While the blocks are shown in a particular order for ease of understanding, other orders may be used. The server may include instructions which, when executed in a computer system, may implement the operation shown in FIG. 13. That is, the server may be configured to implement the operation shown in FIG. 13.

The server may process the command, according to the definition of the command (block 100). Various servers may define any command set and may process the commands as defined. Some commands may be defined that consume active events. For example, a read data command may read the available data indicated by the read event, and thus may consume the read event. A write data command may consume a write event, etc. Some commands may be defined to explicitly change an event to inactive (e.g. for the error event, or one or more of the file metadata events). If the command consumes an event (decision block 102, "yes" leg), the server may record the event as inactive (block 104). In some cases, a command may be defined to consume the event but additional instances of the event may have occurred. For example, additional read data may have become available. In such cases, evaluating if a command consumes the event may include determining if additional instances have occurred.

In an embodiment, a command may automatically re-arm one or more events (e.g. the events that it consumes). As mentioned previously, re-arming of events may be controlled by a re-arm flag or other indication in the notification request, and the re-arming may be responsive to the re-arm flag/indication. If the command is to re-arm one or more events (decision block 106, "yes" leg), the server may re-arm the event or events (block 108). If the re-armed event is active (decision block 110, "yes" leg), the server may generate a notification response on the response Cid indicating the event (block 112).

Figure 14:
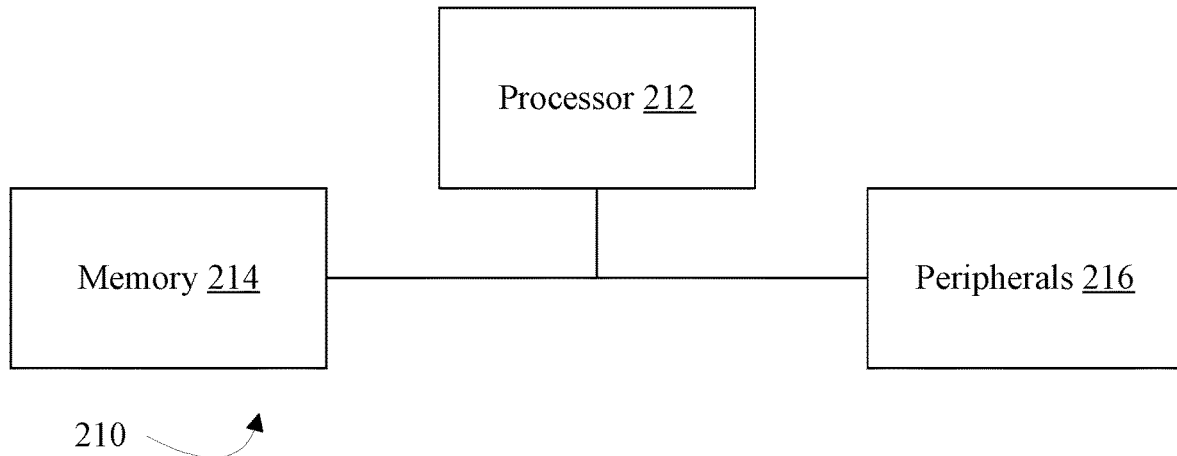
FIG. 14 is a block diagram of one embodiment of a computer system.

Tuning now to FIG. 14, a block diagram of one embodiment of an exemplary computer system 210 is shown. In the embodiment of FIG. 14, the computer system 210 includes at least one processor 212, a memory 214, and various peripheral devices 216. The processor 212 is coupled to the memory 214 and the peripheral devices 216.

The processor 212 is configured to execute instructions, including the instructions in the software described herein such as the various actors, capabilities functions, servers, clients, and/or the kernel. In various embodiments, the processor 212 may implement any desired instruction set (e.g. Intel Architecture-32 (IA-32, also known as x86), IA-32 with 64 bit extensions, x86-64, PowerPC, Sparc, MIPS, ARM, IA-64, etc.). In some embodiments, the computer system 210 may include more than one processor. The processor 212 may be the CPU (or CPUs, if more than one processor is included) in the system 210. The processor 212 may be a multi-core processor, in some embodiments.

The processor 212 may be coupled to the memory 214 and the peripheral devices 216 in any desired fashion. For example, in some embodiments, the processor 212 may be coupled to the memory 214 and/or the peripheral devices 216 via various interconnect. Alternatively or in addition, one or more bridges may be used to couple the processor 212, the memory 214, and the peripheral devices 216.

The memory 214 may comprise any type of memory system. For example, the memory 214 may comprise DRAM, and more particularly double data rate (DDR) SDRAM, RDRAM, etc. A memory controller may be included to interface to the memory 214, and/or the processor 212 may include a memory controller. The memory 214 may store the instructions to be executed by the processor 212 during use, data to be operated upon by the processor 212 during use, etc.

Figure 15:
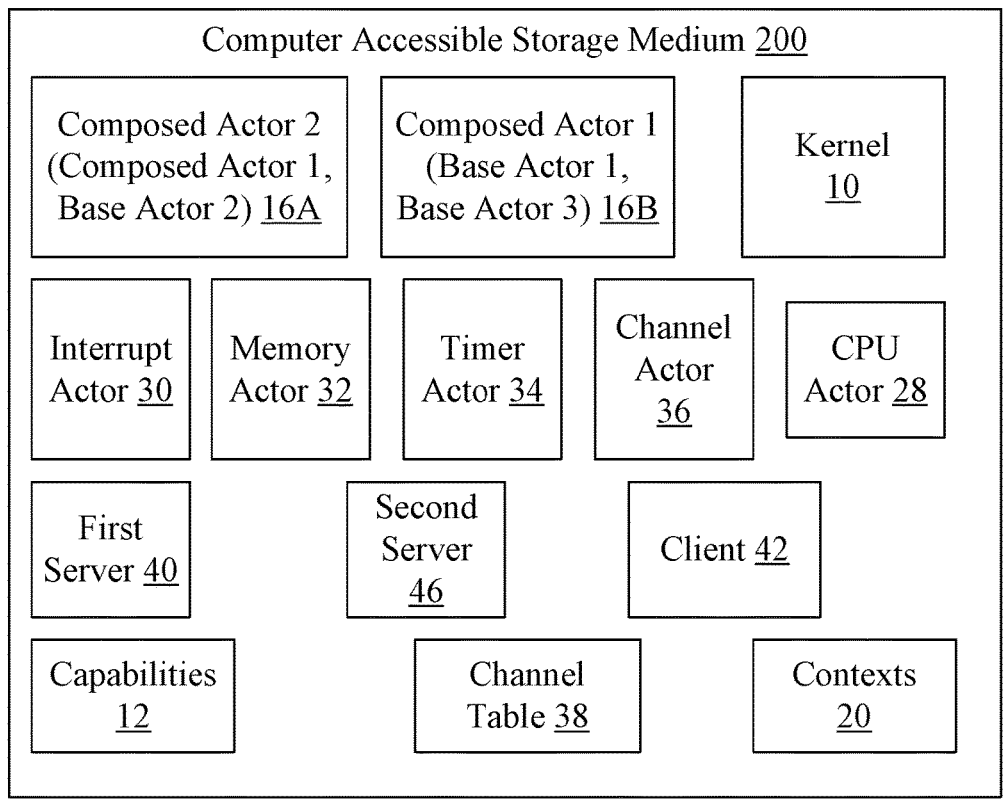
FIG. 15 is a block diagram of one embodiment of a computer accessible storage medium.

Peripheral devices 216 may represent any sort of hardware devices that may be included in the computer system 210 or coupled thereto (e.g. storage devices, optionally including a computer accessible storage medium 200 such as the one shown in FIG. 15), other input/output (I/O) devices such as video hardware, audio hardware, user interface devices, networking hardware, various sensors, etc.). Peripheral devices 216 may further include various peripheral interfaces and/or bridges to various peripheral interfaces such as peripheral component interconnect (PCI), PCI Express (PCIe), universal serial bus (USB), etc. The interfaces may be industry-standard interfaces and/or proprietary interfaces. In some embodiments, the processor 212, the memory controller for the memory 214, and one or more of the peripheral devices and/or interfaces may be integrated into an integrated circuit (e.g. a system on a chip (SOC).

The computer system 210 may be any sort of computer system, including general purpose computer systems such as desktops, laptops, servers, etc. The computer system 210 may be a portable system such as a smart phone, personal digital assistant, tablet, etc. The computer system 210 may also be an embedded system for another product.

FIG. 15 is a block diagram of one embodiment of a computer accessible storage medium 200. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, the computer accessible storage medium 200 may store data in a non-transitory manner, where non-transitory in this context may refer to not transmitting the instructions/data on a signal. For example, non-transitory storage may be volatile (and may lose the stored instructions/data in response to a power down) or non-volatile.

The computer accessible storage medium 200 in FIG. 15 may store code forming the various actors 16A-16B, 28, 30, 32, 34, and 36, the kernel 10, the servers 40 and 46, the client 42 and/or the functions in the capabilities 12. The computer accessible storage medium 200 may still further store one or more data structures such as the channel table 38 and the contexts 20. The various actors 14A-14C, 28, 30, 32, 34, and 36, the kernel 10, the servers 40 and 46, the client 42, and/or the functions in the capabilities 12 may comprise instructions which, when executed, implement the operation described above for these components. A carrier medium may include computer accessible storage media as well as transmission media such as wired or wireless transmission.

Numerous variations and modifications will become apparent to those skilled in the art once the above disclosure is fully appreciated. It is intended that the following claims be interpreted to embrace all such variations and modifications.

What is claimed is:

1. A non-transitory computer accessible storage medium storing a plurality of instructions forming a server that implements at least one service when executed on a computer, wherein the plurality of instructions are computer-executable to:
   receive a notification request from a client on a first channel by the server, the notification request specifying at least one response channel and one or more events for which notification is requested;
   arm the one or more events on the server responsive to the notification request;
   receive one or more commands from the client on the first channel by the server, wherein the one or more commands invoke the at least one service on the server on behalf of the client, am wherein the one or more events are detectable by the server when executing the at least one service on behalf of the client;
   detect a first event of the one or more events that are armed responsive to the notification request, the first event detected during execution of the at least one service on the server on behalf of the client; and
   in response to detecting the first event and determining that the first event is armed, transmit a notification response from the server to the client on the at least one response channel responsive to detecting at least a first event of the one or more events.

2. The non-transitory computer accessible storage medium as recited in claim 1 wherein the instructions are computer-executable to:
   receive a second notification request from the client on the first channel, wherein the second notification request is a poll request specifying one or more second events for which notification is requested; and
   transmit a first response on the first channel responsive to the poll request.

3. The non-transitory computer accessible storage medium as recited in claim 2 wherein the first response indicates which of the one or more second events are active upon receipt of the poll request.

4. The non-transitory computer accessible storage medium as recited in claim 2 wherein the first response indicates no events in response to none of the one or more second events being active upon receipt of the poll request.

5. The non-transitory computer accessible storage medium as recited in claim 1 wherein the notification request registers for the one or more events, and wherein the instructions are further computer-executable to transmit the notification response in response to the first event being active upon receipt of the notification request.

6. The non-transitory computer accessible storage medium as recited in claim 5 wherein the instructions are further computer-executable to transmit the notification response in response to the first event becoming active subsequent to receipt of the notification request.

7. The non-transitory computer accessible storage medium as recited in claim 6 the instructions are further computer-executable to disarm the first event responsive to the notification request specifying level arming.

8. The non-transitory computer accessible storage medium as recited in claim 7 the instructions are further computer-executable to:
   receive a second request from the client on the first channel, wherein the second request is transmitted by the client in response to the notification response indicating the first event; and
   automatically re-arm the first event during processing of the second request responsive to an indication in the notification request.

9. The non-transitory computer accessible storage medium as recited in claim 8 wherein the instructions are further computer-executable to transmit a second notification response on the response channel responsive to the first event being active when the re-arm occurs.

10. The non-transitory computer accessible storage medium as recited in claim 6 the instructions are further computer-executable to permit the first event to remain armed responsive to the notification request specifying edge arming.

11. The non-transitory computer accessible storage medium as recited in claim 1 wherein the notification request specifies an update operation that determines an update of one or more previously armed events on the response channel, and the instructions are further computer-executable to update the previously armed events and the one or more events in the notification request based on the update operation.

12. The non-transitory computer accessible storage medium as recited in claim 11 wherein the update operation is set, and the previously armed events are disarmed and the one or more events are armed in response to the notification request.

13. The non-transitory computer accessible storage medium as recited in claim 11 wherein the update operation is add, and the previously armed events remain armed and the one or more events are armed in response to the notification request.

14. The non-transitory computer accessible storage medium as recited in claim 11 wherein the update operation is delete, and the one or more events are disarmed in response to the notification request.

15. The non-transitory computer accessible storage medium as recited in claim 1 wherein the one or more events are different events for different types of servers.

16. A computer system comprising: one or more processors; and a non-transitory computer accessible storage medium coupled to the one or more processors and storing a plurality of instructions forming a server that implements at least one service when executed on a computer, wherein the plurality of instructions are executable on the one or more processors to:
receive a notification request from a client on a first channel by the server, the notification request specifying at least one response channel and one or more events for which notification is requested;
arm the one or more events on the server responsive to the notification request;
receive one or more commands from the client on the first channel by the server, wherein the one or more commands invoke the at least one service on the server on behalf of the client, and wherein the one or more events are detectable by the server when executing the at least one service on behalf of the client;
detect a first event of the one or more events that are armed responsive to the notification request, the first event detected during execution of the at least one service on the server on behalf of the client; and
in response to detecting the first event and determining that the first event is armed, transmit a notification response from the server to the client on the at least one response channel responsive to detecting at least a first event of the one or more events.

17. The computer system as recited in claim 16 wherein the instructions are executable on the one or more processors to:
receive a second notification request from the client on the first channel, wherein the second notification request is a poll request specifying one or more second events for which notification is requested; and
transmit a first response on the first channel responsive to the poll request.

18. The computer system as recited in claim 17 wherein the first response indicates which of the one or more second events are active upon receipt of the poll request.

19. The computer system as recited in claim 17 wherein the first response indicates no events in response to none of the one or more second events being active upon receipt of the poll request.

20. The computer system as recited in claim 16 wherein the notification request registers for the one or more events, and wherein the instructions are further executable on the one or more processors to transmit the notification response in response to the first event being active upon receipt of the notification request, and to transmit the notification response in response to the first event becoming active subsequent to receipt of the notification request.

21. The computer system as recited in claim 20 the instructions are further executable on the one or more processors to disarm the first event responsive to the notification request specifying level arming.

22. The computer system as recited in claim 21 the instructions are further executable on the one or more processors to:
receive a second request from the client on the first channel, wherein the second request is transmitted by the client in response to the notification response indicating the first event; and
automatically re-arm the first event during processing of the second request responsive to an indication in the notification request.

23. The computer system as recited in claim 22 wherein the instructions are further executable on the one or more processors to transmit a second notification response on the response channel responsive to the first event being active when the re-arm occurs.

24. The computer system as recited in claim 20 the instructions are further executable on the one or more processors to permit the first event to remain armed responsive to the notification request specifying edge arming.

25. The computer system as recited in claim 16 wherein the notification request specifies an update operation that determines an update of one or more previously armed events on the response channel, and the instructions are further computer-executable to update the previously armed events and the one or more events in the notification request based on the update operation.

26. The computer system as recited in claim 25 wherein the update operation is set, and the previously armed events are disarmed and the one or more events are armed in response to the notification request.

27. The computer system as recited in claim 25 wherein the update operation is add, and the previously armed events remain armed and the one or more events are armed in response to the notification request.

28. The computer system as recited in claim 25 wherein the update operation is delete, and the one or more events are disarmed in response to the notification request.

29. A non-transitory computer accessible storage medium storing a plurality of instructions forming a server that implements at least one service when executed on a computer, wherein the plurality of instructions are computer-executable to:
receive a notification request from a client on a first channel by the server, the notification request specifying at least one response channel and one or more events for which notification is requested, wherein the notification request arms the one or more events;
transmit a notification response on the at least one response channel responsive to detecting at least a first event of the one or more events and responsive to determining that the first event is armed by the server when executing the service on behalf of the client;
disarm the first event on the server responsive to the notification request specifying level arming;
receive a second request from the client on the first channel by the server, wherein the second request is transmitted by the client in response to the notification response indicating the first event; and
automatically re-arm the first event during processing of the second request responsive to an indication in the notification request.

30. The non-transitory computer accessible storage medium as recited in claim 29 wherein the instructions are further computer-executable to transmit a second notification response on the response channel responsive to the first event being active when the re-arm occurs.

* * * * *